(12) United States Patent
Li

(10) Patent No.: US 10,291,898 B2
(45) Date of Patent: May 14, 2019

(54) METHOD AND APPARATUS FOR UPDATING NAVIGATION MAP

(71) Applicant: AutoChips Inc., Hefei, Anhui Province (CN)

(72) Inventor: Zhengpeng Li, Hefei (CN)

(73) Assignee: AUTOCHIPS INC., Hefei, Anhui Province (CN)

( * ) Notice: Subject to any disclaimer, the term of this patent is extended or adjusted under 35 U.S.C. 154(b) by 249 days.

(21) Appl. No.: 15/351,402

(22) Filed: Nov. 14, 2016

(65) Prior Publication Data

US 2017/0228933 A1    Aug. 10, 2017

(30) Foreign Application Priority Data

Feb. 4, 2016    (CN) .......................... 2016 1 0084144

(51) Int. Cl.
*H04N 13/00* (2018.01)
*G06T 7/70* (2017.01)
*H04N 13/139* (2018.01)
*G06T 7/60* (2017.01)
*H04N 13/293* (2018.01)
*G06T 15/04* (2011.01)

(52) U.S. Cl.
CPC ............ *H04N 13/139* (2018.05); *G06T 7/60* (2013.01); *G06T 7/70* (2017.01); *G06T 15/04* (2013.01); *H04N 13/293* (2018.05); *G06T 2207/20021* (2013.01); *G06T 2210/32* (2013.01); *G06T 2215/16* (2013.01)

(58) Field of Classification Search
CPC ....... H04N 13/139; H04N 13/293; G06T 7/70

USPC .......................................................... 348/46
See application file for complete search history.

(56) References Cited

U.S. PATENT DOCUMENTS

| 2005/0234638 | A1 | 10/2005 | Ogaki et al. |
| 2009/0171581 | A1 | 7/2009 | Ushida et al. |
| 2013/0321398 | A1* | 12/2013 | Howard ............... G06T 19/00 345/419 |
| 2014/0192055 | A1 | 7/2014 | Kim |
| 2015/0268058 | A1* | 9/2015 | Samarasekera .... G06K 9/00637 701/409 |

(Continued)

FOREIGN PATENT DOCUMENTS

| CN | 102538802 A | 7/2012 |
| CN | 102929969 A | 2/2013 |

(Continued)

OTHER PUBLICATIONS

Jun Sun, "Three-Dimensional Map Construction Based on Ground Moving Robot's Perception Information", China Excellent Master's Thesis Full-text Database Information Technology Series, Dec. 15, 2005, pp. 140-147, vol. 8, China.

(Continued)

*Primary Examiner* — Jeffery A Williams
(74) *Attorney, Agent, or Firm* — Cheng-Ju Chiang

(57) ABSTRACT

A method and an apparatus for updating navigation map are disclosed. The method includes: fusing captured three-dimensional (3D) data and two-dimensional data (2D) image data of a street view to generate 3D fused data representing the street view; and updating the navigation map in real time according to the 3D fused data. Thus, the disclosure provides a way to update the navigation map in real time.

16 Claims, 6 Drawing Sheets

(56) References Cited

U.S. PATENT DOCUMENTS

2017/0305546 A1   10/2017   Ni et al.

FOREIGN PATENT DOCUMENTS

| CN | 103236160 A | 8/2013 |
| CN | 103345630 A | 10/2013 |
| CN | 103389104 A | 11/2013 |
| CN | 103674016 A | 3/2014 |
| CN | 104359487 A | 2/2015 |
| CN | 105203095 A | 12/2015 |

OTHER PUBLICATIONS

Ling Dong Wu, Huahua Chen, Xin Du, Wei Kang Gu, "Real Time 3D Map Building Based on Stereo Vision", Chinese Journal of Sensors and Actuators, Feb. 2006, pp. 175-178, vol. 19, Issue No. 1, China Academic Journal Electronic Publishing House, Hangzhou City, China.

Yue Zhang, "Panoramic Image Based on Two Dimensional or Three Dimensional Map System", Dams and Security, Dec. 31, 2013, pp. 27-29 and 35, China Academic Journal Electronic Publishing House, Hangzhou City, China.

\* cited by examiner

METHOD AND APPARATUS FOR UPDATING NAVIGATION MAP

FIELD OF THE DISCLOSURE

The present disclosure relates to image processing, and more particularly, to a method and an apparatus for updating navigation maps.

BACKGROUND OF THE DISCLOSURE

Vehicle mounted computers can be used as infotainment systems in vehicles. The vehicle mounted computers can deliver both entertainment and information content. Many vehicle mounted computers are now installed with navigation maps, which include software for route planning and navigation functions. Because urban roads and the surrounding buildings can constantly change, navigation maps would need to be updated frequently to acquire the latest road information. The updated versions for the navigation maps may be provided by map vendors. Typically, the vehicle owner may go to a car shop, dealership, or map vendor to download and install the updated versions.

However, the updated versions provided by either of a car shop, dealership, or map vendor may not include the latest road conditions and have difficulty in covering real-time road conditions.

SUMMARY OF THE DISCLOSURE

A primary technical issue to be addressed by the disclosure is to provide a method and an apparatus for updating navigation maps in real time.

One technical solution adopted by the disclosure is to provide a method for updating a navigation map includes fusing captured three-dimensional (3D) data and two-dimensional data (2D) image data of a street view to generate 3D fused data representing the street view; and updating the navigation map in real time according to the 3D fused data.

To address the above technical issue, another technical solution adopted by the disclosure is to provide an apparatus for updating the navigation map. The apparatus includes a data fusion module, configured to fuse captured three-dimensional (3D) data and two-dimensional (2D) image data of a street view to generate 3D fused data representing the street view; and an update module, configured to update the navigation map in real time according to the 3D fused data generated by the data fusion module.

According to the disclosure, the 3D data and 2D image data of the street view can be captured and fused to generate the 3D fused data representing the street view in real time, further the navigation map also can be updated in real time according to the 3D fused data. Thus, the disclosure provides a way to update the navigation map in real time.

DETAILED DESCRIPTION OF THE DISCLOSURE

The disclosure will be described in detail with reference to the accompanying drawings and embodiments.

Figure 1:
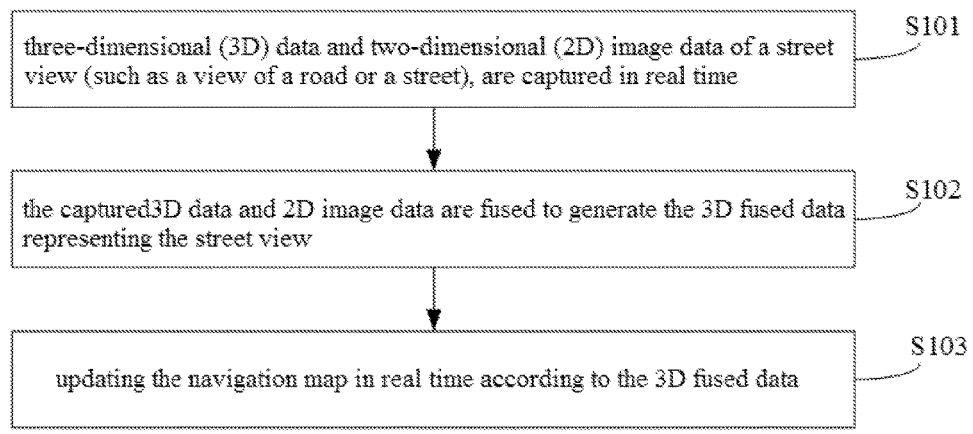
FIG. 1 shows a flow chart illustrating a method for updating a navigation map according to an embodiment of the disclosure.

Referring to FIG. 1, a method for updating a navigation map according to the disclosure includes the following steps.

In step S101, three-dimensional (3D) data and two-dimensional (2D) image data of a street view (such as a view of a road or a street), are captured in real time.

Different types of collection devices may be used to capture the 3D data and the 2D image data. In one example, a 3D scanning device can be used to scan the spatial models of roads, surrounding buildings, and other objects in 360 degrees to generate the 3D data. The 3D data may include parameters, such as the distance and the angle of a road, a street, or a building with respect to the 3D scanning device. For example, FIG. 5, which will be discussed below shows the distance and angle of a collected point (i.e., a street view) with respect to a scanning device. The 3D scanning device can be, for example, a Focus 3D*330. However, any suitable type of 3D scanning device can be used. Simultaneously, one or more image capture devices can be used to capture the 2D image data of the street view. The image capture devices can be, for example, photographic equipment, which can take pictures of the road, the street, and the buildings in 360 degrees.

The 3D scan function and the image capture function can also be integrated in a single collection device, which can take replace the 3D scanning device and one or more image capture devices to capture the 3D data and the 2D image data of the street view.

The 3D scanning device and the image capture device can be mounted on vehicles, such as cars, to collect the 3D data and the 2D image data of the street view in real time. In addition, the 3D scanning device and the image capture device can also be arranged on a road as public facilities, to capture the 3D data and 2D image data of the street view in real time. The vehicle mounted computers can build up communication connections with these public facilities to receive the 3D data and 2D image data of the street view that are captured by these public facilities.

According to one aspect, a single collection device can be used to capture the 3D data and 2D image data of the street view in real time at a same distance and angle. The distance may refer to the distance of the street view with respect to the single collection device. The angle may refer to the angle of the view with respect to the single collection device.

Thus, when the 3D data of the street view has been captured in real time at a certain distance and angle, the 2D image data of the street view can also be captured in real time at the same distance and angle. For example, the 3D data of a building A has been captured by a single collection ,wherein the distance of the building A with respect to the single collection device is a meters and the angle of the building A with respect to the single collection device is b degree, then the 2D image data of the same building A will also be captured when the distance of the building A with respect to the single collection device is a meters and the angle of the building A with respect to the single collection device is b degree. Thus, after the 3D data and the 2D image data of the building A are fused to a 3D fused data, the 3D data and the 2D image data comprised in the 3D fused data will not have any vision deviation.

Figure 5:
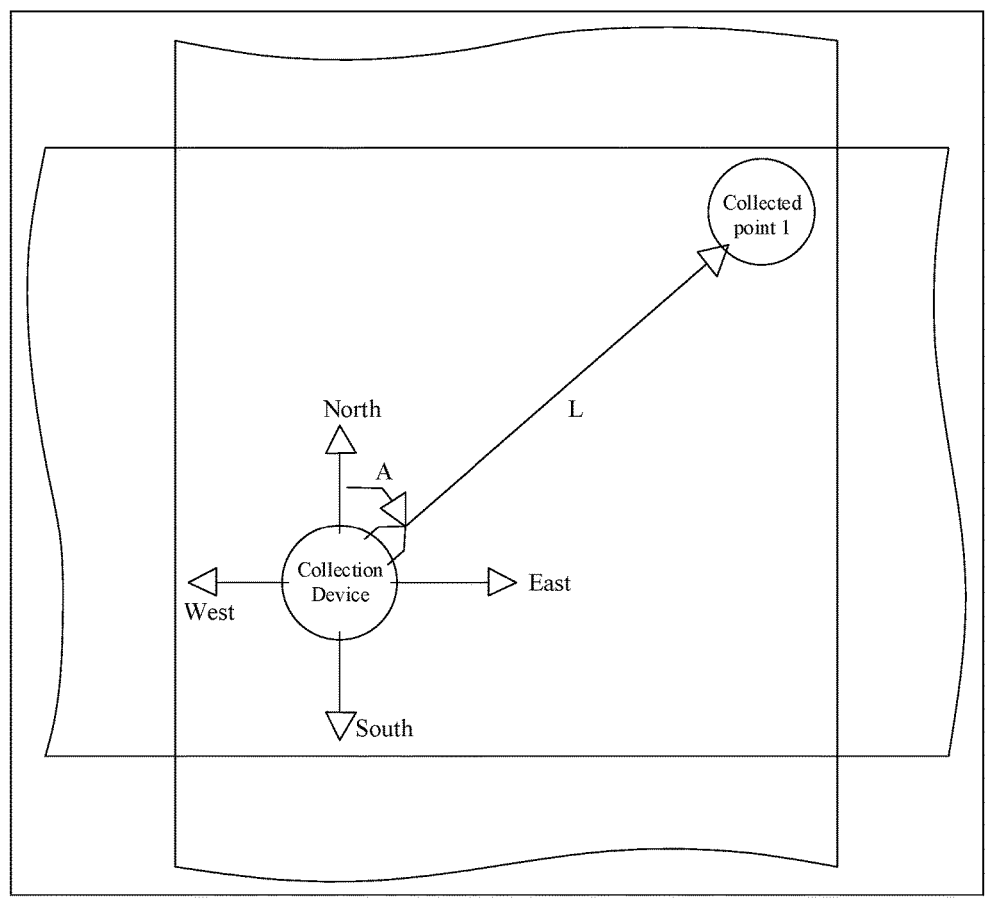
FIG. 5 is a schematic diagram illustrating the determination of a position of a collected point according to the methods for updating the navigation map of the disclosure.

Referring now to FIG. 5, the 3D data of the collected point 1 is scanned and captured when the distance of the collected point 1 with respect to the collection device is L meters and the angle of the collected point 1 with respect to the collection device is A degree. Thus, the 2D image data of this collected point 1 will also be captured by this collection device when the distance of the collected point 1 with respect to the collection device is L meters and the angle of the collected point 1 with respect to the collection device is A degree.

The 3D data and the 2D image data can also be respectively captured by the collection device at different distances and angles, in which case the collected 3D data and 2D image data may need to be converted and computed to have the same distance and angle with respect to the collection device before they can be accurately fused.

According to another aspect, if different collection devices are used to capture the 3D data and the 2D image data of the street view respectively, then the different collection devices can be adjusted to capture the same region of the same street view at the same distance and angle, such that the generated 3D fused data will not have any vision deviation. In addition, the 3D data and the corresponding 2D image data can be separately collected by the different collection devices at different distances and angles, in which case the collected 3D data and 2D image data may need to be converted to have the same distance and angle with respect to one of the different collection devices, before the data can be accurately fused. In one example, the different collection devices are a 3D scanning device and an image capture device.

Figure 2:
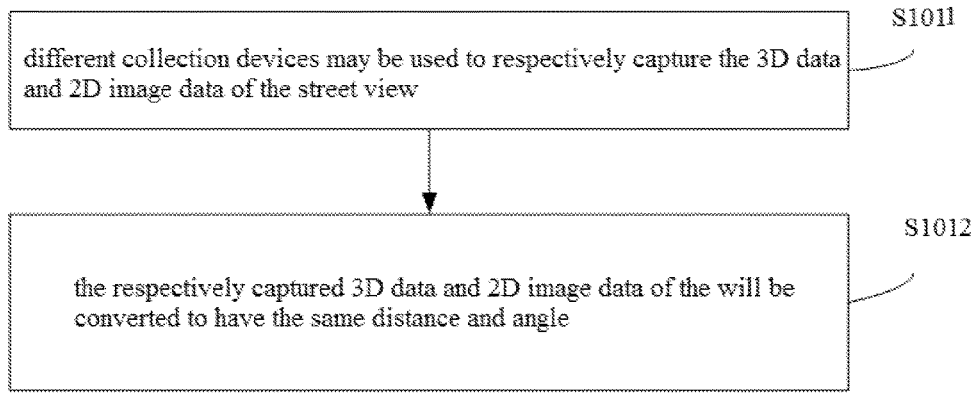
FIG. 2 shows a flow chart illustrating some details of the step S101 according to an embodiment of the disclosure.

Referring now to FIG. 2, when different collection devices are used to respectively capture the 3D data and the 2D image data, the step S101 may include the following sub-steps.

In sub-step S1011, different collection devices may be used to respectively capture the 3D data and 2D image data of the street view.

In sub-step S1012, the respectively captured 3D data and 2D image data of the will be converted to have the same distance and angle. The distance may refer to the distance of the street view with respect to one of the different collection devices, while the angle may refer to the angle of the street view with respect to the same one of the different collection devices.

Referring now again to FIG. 1, in step S102, the captured 3D data and 2D image data are fused to generate the 3D fused data representing the street view.

Typically, the 3D data may refer to the spatial data reflecting the structure of an object. Figuratively speaking, the 3D data can be regarded as the skeleton of the object such as the framework of a building, whereas the 2D image data can depict the two-dimensional or planar appearance of the object. Figuratively speaking, the 2D image data can be viewed as the outer skin of an object such as the paint, appearance, and color of the exterior of the building. The 3D fused data is the integration of the spatial data reflecting the physical structure with the planar data reflecting the appearance. For example, the 3D fused data can be regarded as the addition of a corresponding outer skin onto the framework of an object. One such example is adding paint colors to a framework of a freshly capped building to form a complete three-dimensional appearance.

Data fusion techniques can be used to combine the 3D data and the 2D image data of the street view. Typically, in a unified geographic coordinate system, certain algorithms can be used to combine the 3D data and the 2D image data, which are detected by the same collection device, to generate the 3D fused data, which contains not only the contour profile, but also the planar appearance.

Based on the required information abstraction degree, any data fusion means, or a combination of multiple data fusion means, can be used to fuse the 3D data and 2D image data of the street view. The data fusion means can include at least one of pixel-based fusion, feature-based fusion, and decision-based fusion. The fusion techniques for combining the 3D data and the 2D image data are well-known in the art, and thus will not be described in detail herein.

In step S103, updating the navigation map in real time according to the 3D fused data.

Optionally, before the step S103, the navigation map may be divided into multiple tiles, each covering a region in the navigation map with a predetermined length and width.

Figure 3:
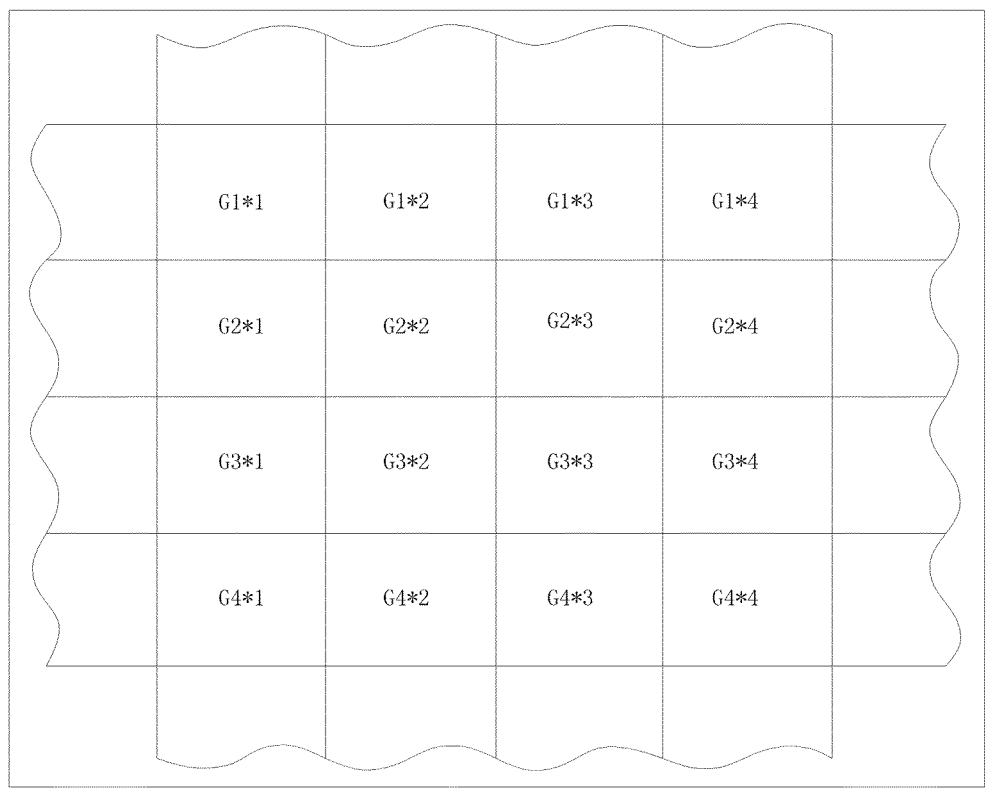
FIG. 3 is a schematic diagram illustrating the division of a navigation map onto multiple position tiles according to an embodiment the disclosure.

As shown in FIG. 3, the navigation map may be divided into 16 position tiles (G1\*1, G1\*2, . . . , and G4\*4). Each position tile may cover a region with a fixed length and width such as, 100 meters multiply 100 meters. The whole navigation map can be tiled by these position tiles.

Figure 4:
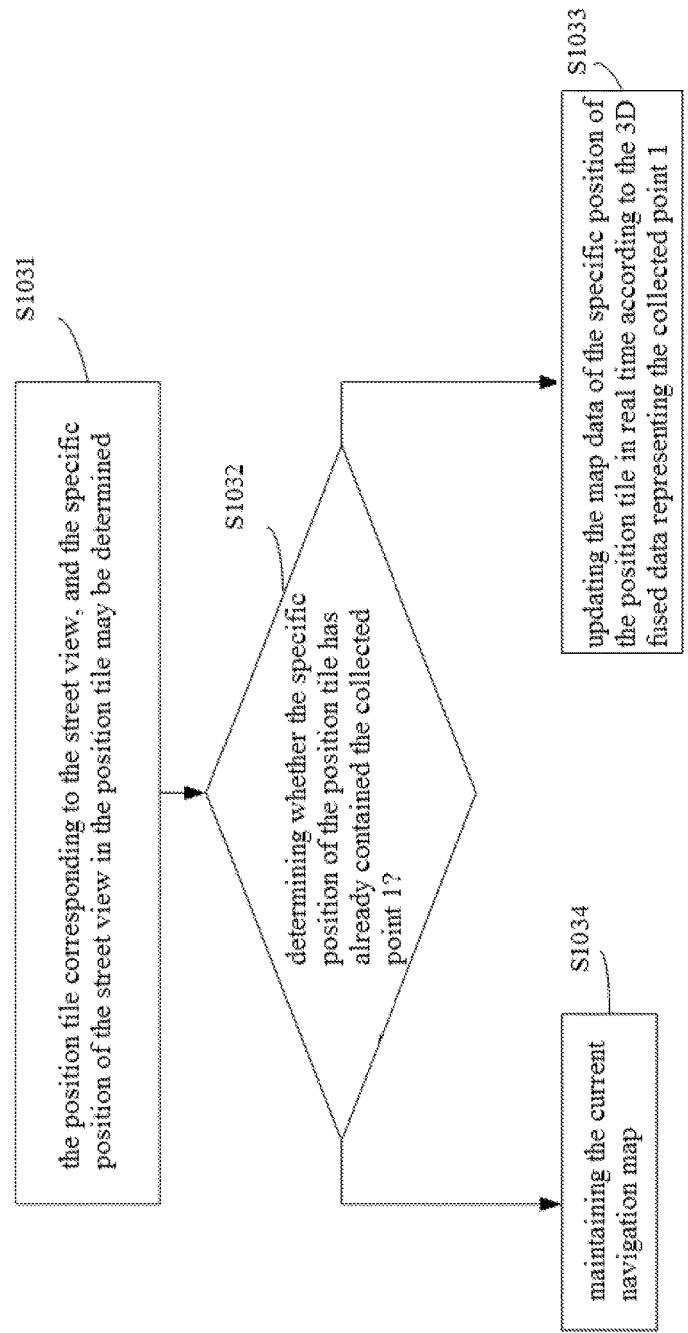
FIG. 4 shows a flow chart illustrating some details of the step S103 according to an embodiment of the disclosure.

Referring now to FIG. 4, in some examples of the disclosure, the step S103 may include sub-steps S1031, S1032, S1033 and S1034.

In the sub-step S1031, the position tile corresponding to the street view, and the specific position of the street view in the position tile may be determined based on global positioning system (GPS) position information of a collection device, and the distance and angle of the street view with respect to the collection device.

The determined specific position of the street view in the position tile, can be a relative position with respect to the collection device, and can also be an absolute position expressed with latitude and longitude.

Now, referring to FIG. 5 again, in a single position tile, a compass in the collection device may first determine the four standard orientations, i.e., the east, the west, the south, and the north. To acquire the data of the collected point 1 (i.e., street view), a collecting head of the collection device may point to the collected point 1 and an angle A of the collecting head with respect to the reference orientation (referring to "north" in this example) will be stored. A distance determining component of the collection device may then determine the distance L of the collected point 1 with respect to the collection device. The current GPS position information of the collection device and the angle A, as well as the distance L, could be utilized to locate the specific position of the collected point 1. The specific position can be an absolution position expressed with latitude and longitude. The collection device may be used to collect the 3D data or the 2D image data.

In the sub-step S1032, determining whether the specific position of the position tile has already contained the collected point 1. If yes, the method may proceed to the sub-step S1034. If not, the method may proceed to step S1033.

In the sub-step S1033, updating the map data of the specific position of the position tile in real time according to the 3D fused data representing the collected point 1.

In the sub-step S1034, maintaining the current navigation map.

The sub-step S1032 can be optional. In addition, if it is determined that the format of the 3D fused data is not consistent with the map data format of the navigation map, then the format may need to be converted before sub-step S1033.

Figure 6:
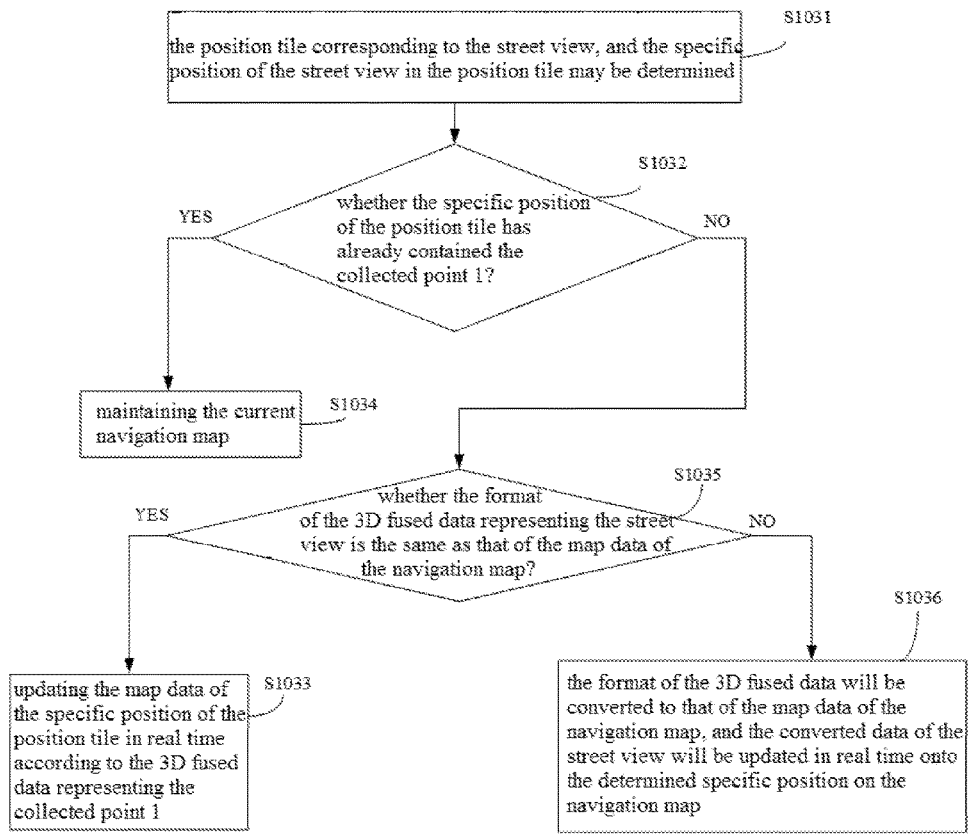
FIG. 6 shows a flow chart illustrating some details of the step S103 according to another embodiment of the disclosure.

Referring to FIG. 6, when the determination result at the sub-step S1032 is negative, the method may further include the following steps.

In a following sub-step S1035, determining whether the format of the 3D fused data representing the street view is the same as that of the map data of the navigation map.

In a following sub-step S1036, if the formats are different, the format of the 3D fused data will be converted to that of the map data of the navigation map, and the converted data of the street view will be updated in real time onto the determined specific position on the navigation map, that is, updating the map data of the specific position of the position tile in real time according to the converted 3D fused data. If the formats are the same, the method may proceed to the sub-step S1033.

Other methods can also be used to update the navigation map in real time. For example, while capturing data, the navigation map can be notified to lock the region of the navigation map that is currently displayed on the screen. The 3D fused data, which is generated in real time, can be directly updated to the locked region on the screen, after which, new data (i.e., new 3D data and new 2D image data) will be captured and fused and synchronously updated. In another example, while capturing data, the navigation map can be notified to lock the region of the navigation map that is currently displayed on the screen. A correspondence between the 3D fused data and the locked region can be established and it is recorded that map updates are available for this locked region, so that next time the vehicle passes the same region and parses that map updates are available, the 3D fused data corresponding to this locked region will be directly updated to the navigation map.

According to the disclosure, the 3D data and 2D image data of the street view can be captured in real time, and are fused together into 3D fused data, which can then be used to update the navigation map in real time. Since the 3D fused data, which is synchronously generated by the combination of currently collected data, the navigation map can be updated in real time. Thus, the currently captured street view can be in time displayed on the route that the vehicle is traveling on, that is, the updated navigation map can cover the real-time road conditions.

Figure 7:
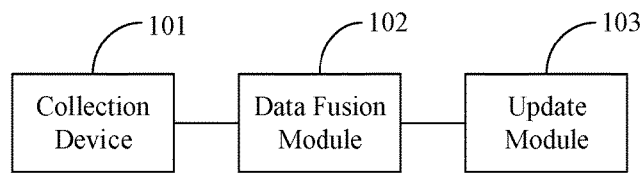
FIG. 7 shows a block diagram of an apparatus for updating a navigation map according to an embodiment of the present invention.

Referring now to FIG. 7, an apparatus for updating the navigation map according to the disclosure includes at least one collection device 101, a data fusion module 102, and an update module 103.

The at least one collection device 101 may capture the 3D data and the 2D image data of a street view (such as, a view of a road or a street) in real time.

Different types of collection devices can be used to capture the 3D data and 2D image data. In one example, a 3D scanning device can be used to scan the spatial models of roads, surrounding buildings, and other objects in 360 degrees to generate the 3D data. The 3D data may include parameters such as the distance and angle of a road, a street, or a building with respect to the 3D scanning device. For example, FIG. 5, which shows the distance and angle of a collected point (i.e., a street view) with respect to a scanning device. The 3D scanning device can be, for example, a Focus_3D*330. However, any suitable type of 3D scanning device can be used. Simultaneously, image capture devices can be used to capture the 2D image data of the street view. The image capture devices can be, for example, photographic equipment. The image capture devices can take pictures of the road, the street, and the buildings in 360 degrees.

The collection devices 101 may include vehicle mounted collection devices and/or those arranged on a road as public facilities, to collect the 3D data and 2D image data of the street view in real time. The vehicle mounted computers can build up communication connections with these public facilities to receive the 3D data and 2D image data of the street view that are captured by these public facilities.

The 3D scan function and the image capture function can also be integrated in a single collection device, which can take replace the 3D scanning device and one or more image capture devices to capture the 3D data and the 2D image data of the street view.

According to one aspect, when a single collection device is used to collect the 3D data and the 2D image data of the street view in real time, the collection device 101 may collect the 3D data and the 2D image data of the street view at a same distance and angle. The distance may refer to the distance of the street view with respect to the single collection device, while the angle may refer to the angle of the street view with respect to this single collection device.

Thus, when the 3D data of the street view has been captured in real time at a certain distance and angle, the 2D image data of the street view can also be captured in real time at the same distance and angle. For example, the 3D data of a building A has been captured by a single collection, wherein the distance of the building A with respect to the single collection device is a meters and the angle of the building A with respect to the single collection device is b degree, then the 2D image data of the same building A will also be captured when the distance of the building A with respect to the single collection device is a meters and the angle of the building A with respect to the single collection device is b degree. Thus, after the 3D data and the 2D image data of the building are fused to a 3D fused data, the 3D data and the 2D image data comprised in the 3D fused data will not have any vision deviation.

Referring now to FIG. 5, the 3D data of the collected point 1 is scanned and captured when the distance of the collected point 1 with respect to the collection device is L meters and the angle of the collected point 1 with respect to the collection device is A degree. Thus, the 2D image data of this collected point 1 will also be captured by this collection device when the distance of the collected point 1 with respect to the collection device is L meters and the angle of the collected point 1 with respect to the collection device is A degree.

The 3D data and the 2D image data can also be respectively captured by the collection device at different distances and angles, in which case the collected 3D data and 2D image data may need to be converted and computed to have the same distance and angle with respect to the collection device before they can be accurately fused.

According to another aspect, if different collection devices are used to capture the 3D data and the 2D image data of the street view respectively, then the different collection devices can be adjusted to capture the same region of the same street view at the same distance and angle, such that the generated 3D fused data will not have any vision deviation. In addition, The 3D data and the corresponding 2D image data can also be separately collected by different collection devices at different distances and angles, in which case the collected 3D data and 2D image data may need to be converted to have the same distance and angle with respect to one of the different collection devices, before the data can be accurately fused. In one example, the different collection devices are a 3D scanning device and an image capture device.

Figure 8:
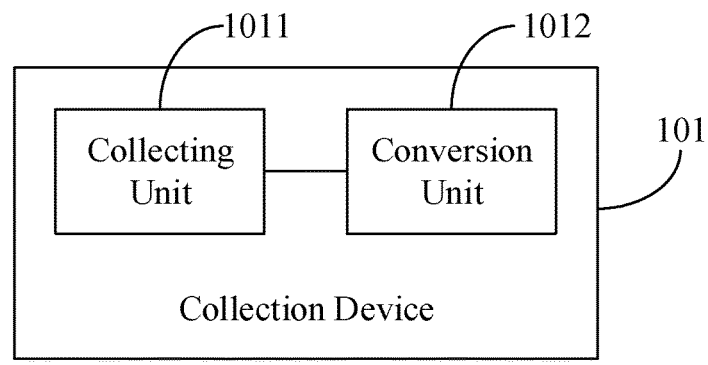
FIG. 8 shows a block diagram of some details of the collection device 101 according to an embodiment of the disclosure.

Referring now to FIG. 8, if different collection devices are used to capture the 3D data and the 2D image data of the street view in real time, at least one collection device 101 may include a collecting unit 1011 and a conversion unit 1012.

The collecting unit may capture the 3D data or 2D image data of the street view.

The conversion unit 1012 may convert the 3D data and 2D image data of the street view, which are respectively collected by the different collection devices, to have the same distance and angle. The distance may refer to the distance of the street view with respect to one of the different collection devices, while the angle may refer to the angle of the street view with respect to the same one of the different collection devices.

The data fusion module 102 may fuse the 3D data and the 2D image data, which are collected by the collection devices 101, to generate the 3D fused data representing the street view. Typically, the 3D data may refer to the spatial data reflecting the structure of an object. Figuratively speaking, the 3D data can be regarded as the skeleton of an object such as the framework of a building, whereas, the 2D image data can depict the two-dimensional or planar appearance of an object. Figuratively speaking, the 2D image data can be viewed at the outer skin of an object such as, the paint, appearance, and color of the exterior of the building. The 3D fused data is the integration of the spatial data reflecting the physical structure with the planar data reflecting the appearance. For example, the 3D fused data can be regarded as the addition of a corresponding outer skin onto the framework of an object. One such example can be adding paint colors to a framework of a freshly capped building to form a complete three-dimensional appearance.

Data fusion techniques can be used to combine the 3D data and the 2D image data of the street view. Typically, in a unified geographic coordinate system, certain algorithms are used to combine the 3D data and the 2D image data of a same target to generate the 3D fused data which includes not only the contour profile, but also the planar picture.

Based on the required information abstraction degree, any data fusion means, or a combination of the multiple data fusion means, can be used to fuse the 3D data and 2D image data of the street view. The data fusion means can include at least one of pixel-based fusion, feature-based fusion, and decision-based fusion.

The data fusion module 102 may use certain data fusion algorithms to further fuse the converted 3D data and 2D image data of the street view to generate the 3D fused data for the street view.

When update the navigation map in real time according to the 3D fused data, a live picture reflecting the street view can be seen on the navigation screen consistent with the view seen by the naked eyes.

The update module 103 may update the navigation map in real time according to the 3D fused data.

Optionally, this apparatus may further include a division module. The division module may divide the navigation map into multiple position tiles, each covering a region in the navigation map with a predetermined length and width.

As shown in FIG. 3, the navigation map may be divided into 16 position tiles (G1*1, G1*2, . . . , and G4*4). Each position tile may cover a region with fixed length and width such as, 100 meters multiply 100 meters. The whole navigation map can be tiled by these position tiles.

Figure 9:
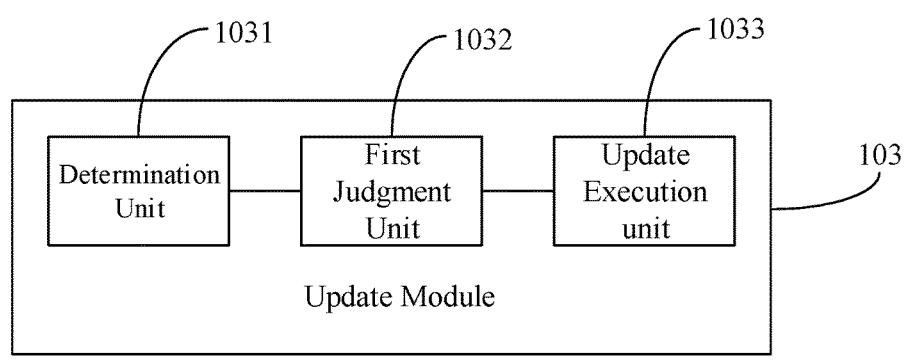
FIG. 9 shows a block diagram of some details of the update module 103 according to an embodiment of the disclosure.

Referring now to FIG. 9, in some examples of the disclosure, the update module 103 may include a determination unit 1031, a first judgment unit 1032, and an update execution unit 1033.

The determination unit 1031 may determine the position tile corresponding to the street view, and the specific position of the street view in the position tile based on the GPS position information of this collection device, and the distance and angle of the collected street view with respect to this collection device.

The determined specific position of the street view in the position tile, can be a relative position with respect to the collection device, and can also be an absolute position expressed with latitude and longitude.

The first judgment unit 1032 may determine whether the specific position of the position tile has already contained the collected point 1.

The update execution unit 1033 may directly update, when the determination of the first judgment unit 1032 is negative, the map data of the specific position of the position tile in real time according to the 3D fused data representing the collected point 1. When the determination of the first judgment unit 1032 is positive, the update execution unit will maintain the current navigation map.

The first judgment unit 1032 can be optional. In addition, if it is determined that the format of the 3D fused data is not consistent with the map data format of the navigation map, then the format may need to be converted before the update execution unit 1033 perform the corresponding update operations. In this case the update module 103 may further include a second judgment module.

When the determination of the first judgment unit 1032 is negative, the second judgment module may determine whether the format of the 3D fused data representing the street view is the same as that of the map data of the navigation map.

When the determination of the second judgment unit is negative, the update execution unit 1033 may convert the format of the 3D fused data into that of the map data of the navigation map, and the converted data of the street view will be updated in real time onto the determined specific position on the navigation map, that is, updating the map data of the specific position of the position tile in real time according to the converted 3D fused data. When the determination of the second judgment unit is positive, the update execution unit 1033 may directly update the 3D fused data representing the street view onto the determined specific position on the navigation map.

Other methods can also be used to update the navigation map in real time. For example, while capturing data, the navigation map can be notified to lock the region of the navigation map that is currently displayed on the screen. The 3D fused data, which is generated by combining the collected data, can be directly updated to the locked region on the screen, after which new data will be captured and fused and synchronously updated. In another example, while capturing data, the navigation map may be notified to lock the region of the navigation map that is currently displayed on the screen. A correspondence between the 3D fused data and the locked region can be established and it is recorded that map updates are available for this locked region, so that next time the vehicle passes the same region and parses that map updates are available, the 3D fused data corresponding to this locked region will be directly updated to the navigation map.

Furthermore, it is apparent to those skilled in the art that, the present disclosure also provides an apparatus for updating a navigation map, the apparatus comprising a non-transitory program storage medium and a processor. The non-transitory program storage medium stores a program executed by the processor to perform the methods as described above. Furthermore, it is apparent to those skilled in the art that various units or modules 102, 103, 1011, 1012, 1031, 1032 and 1033, as shown in FIGS. 7-9, can be software modules or software units. In another aspect, it is well-known that various software modules or software units can be inherently stored in the non-transitory program storage medium and executed by the processor.

According to the disclosure, the 3D data and 2D image data of the road or street view can be collected in real time, and fused into 3D fused data, which is then can be used to update the navigation map in real time. Since the 3D fused data, which is synchronously generated by the combination of currently collected data, the navigation map can be updated in real time. Thus, the currently captured street view can be in time displayed on the route that the vehicle is traveling on, that is, the updated navigation map can cover the real-time road conditions.

The above description is only the embodiments of the present disclosure, and is not limiting the scope of the disclosure. Any equivalent structures or flow modifications made without departing from the specification or accompanying drawings of the disclosure, or any direct or indirect application of the disclosure in any other related fields shall all be covered within the protection of the disclosure.

The invention claimed is:

1. A method for updating a navigation map, comprising:
fusing captured three-dimensional (3D) data and two-dimensional data (2D) image data of a street view to generate 3D fused data representing the street view;
dividing the navigation map into a plurality of position tiles, each position tile covering a region in the navigation map with a predetermined length and width; and
updating the navigation map in real time according to the 3D fused data;
wherein the step of updating the navigation map in real time according to the 3D fused data comprises:
determining the position tile of the navigation map corresponding to the street view and a specific position of the street view in the position tile, based on global positioning system (GPS) position information of a collection device, and the distance and angle of the street view with respect to the collection device;
determining whether the specific position of the position tile has already contained the street view;
if not, updating the map data of the specific position of the position tile in real time according to the 3D fused data representing the street view; and
if yes, maintaining the current navigation map.

2. The method of claim 1, further comprising, before the step of fusing captured three-dimensional (3D) data and two-dimensional data (2D) image data of a view of a street to generate 3D fused data representing the street view:
capturing, by at least one collection device, the 3D data and the 2D image data of the street view in real time.

3. The method of claim 2, wherein the at least one collection device is mounted on a vehicle.

4. The method of claim 2, wherein the at least one collection device is arranged on the street.

5. The method of claim 2, wherein when a single collection device is used to capture the 3D data and the 2D image data of the street view, the step of capturing the 3D data and the 2D image data of the street view in real time comprises:
capturing, by the collection device, in real time, the 3D data and the 2D image data of the street view at a same distance and angle, wherein the distance refers to the distance of the street view with respect to the collection device, and the angle refers to the angle of the street view with respect to the collection device.

6. The method of claim 2, wherein when different collection devices are used to capture the 3D data and the 2D image data of the street view respectively, the step of capturing the 3D data and the 2D image data of the street view in real time comprises:
capturing, by the different collection devices, the 3D data and the 2D image data of the street view in real time, respectively; and
converting the 3D data and the 2D image data that are captured by the different collection devices to have a same distance and angle, wherein the distance refers to the distance of the street view with respect to one of the different collection devices, and the angle refers to the angle of the street view with respect to the same one of the different collection device.

7. The method of claim 6, wherein the step of fusing captured 3D data and 2D image data of the street view to generate 3D fused data representing the street view comprises:
using data fusion algorithms to fuse the converted 3D data and 2D image data of the street view to generate the 3D fused data representing the street view.

8. The method of claim 1, further comprising:
when the result of the determination is negative, further determining whether a format of the 3D fused data representing the street view is the same as that of the map data of the navigation map;
when the formats are different, converting the format of the 3D fused data into that of the map data of the navigation map, and updating the map data of the specific position of the position tile in real time according to the converted 3D fused data; and
when the formats are same, directly updating the map data of the specific position of the position tile in real time according to the converted 3D fused data.

9. The method of claim 2, wherein the at least one collection device further comprises an 3D scanning device and an image capture device, and the 3D data is captured by the 3D scanning device, and the 2D image data is captured by the image capture device.

10. An apparatus for updating a navigation map, comprising:
a data fusion module, configured to fuse captured three-dimensional (3D) data and two-dimensional (2D) image data of a street view to generate 3D fused data representing the street view;
a division module configured to divide the navigation map into a plurality of position tiles, each position tile covering a region in the navigation map with a predetermined length and width; and
an update module, configured to update the navigation map in real time according to the 3D fused data generated by the data fusion module;

wherein the update module comprises:
a determination unit configured to determine the position tile of the navigation map corresponding to the r street view and a specific position of the street view in the position tile, based on global positioning system (GPS) position information of a collection device, and the distance and angle of the r street view with respect to the collection device;
a first judgment unit configured to determine whether the specific position of the position tile has already contained the street view; and
an update execution unit configured to, when the result of the determination is negative, update the map data of the specific position of the position tile in real time according to the 3D fused data representing the street view, and when the result of the determination of the first judgment unit is positive, maintaining the current navigation map.

11. The apparatus of claim 10, further comprising:
at least one collection device, configured to capture the 3D data and the 2D image data of the street view in real time before they are fused by the data fusion module.

12. The apparatus of claim 11, wherein the at least one collection device is mounted on a vehicle or arranged on the street.

13. The apparatus of claim 10, wherein when a single collection device is used to capture the 3D data and the 2D image data of the street view in real time, the collection device is configured to respectively capture the 3D data and the 2D image data of the street view at a same distance and angle, wherein the distance refers to the distance of the street view with respect to this collection device, and the angle refers to the angle of the street view with respect to this collection device.

14. The apparatus of claim 10, wherein when different collection devices are used to respectively capture the 3D data and the 2D image data of the street view, at least one of these collection devices comprises:
a collecting unit configured to capture the 3D data and the 2D image data of the street view; and
a conversion unit configured to convert the 3D data and the 2D image data that are captured by the different collection devices to have a same distance and angle, wherein the distance refers to the distance of the street view with respect to one of these collection devices, and the angle refers to the angle of the street view with respect to the same one of these collection device.

15. The apparatus of claim 14, wherein the data fusion module is configured to use data fusion algorithms to fuse the converted 3D data and 2D image data of the street view to generate the 3D fused data representing the street view.

16. The apparatus of claim 10, wherein the update module further comprises:
a second judgment unit configured to, when the result of the determination is negative, determine whether a format of the 3D fused data representing the road or street view is the same as that of the map data of the navigation map;
wherein the update execution unit is further configured to, when the formats are different, convert the format of the 3D fused data to that of the map data of the navigation map, and update the map data of the specific position of the position tile in real time according to the converted 3D fused data, and when the formats are same, directly update the map data of the specific position of the position tile in real time according to the converted 3D fused data.

* * * * *